(12) United States Patent
Klopsch et al.

(10) Patent No.: US 9,150,709 B2
(45) Date of Patent: Oct. 6, 2015

(54) EPOXY RESIN COMPOSITIONS COMPRISING A 2-OXO-[1,3] DIOXOLANE DERIVATIVE

(71) Applicant: BASF SE, Ludwigshafen (DE)

(72) Inventors: Rainer Klopsch, Worms (DE); Miran Yu, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 392 days.

(21) Appl. No.: 13/644,413

(22) Filed: Oct. 4, 2012

(65) Prior Publication Data

US 2013/0085209 A1  Apr. 4, 2013

Related U.S. Application Data

(60) Provisional application No. 61/542,828, filed on Oct. 4, 2011.

(51) Int. Cl.
| | |
|---|---|
| *C08K 5/09* | (2006.01) |
| *C08K 5/1565* | (2006.01) |
| *C09D 163/00* | (2006.01) |
| *C09J 163/00* | (2006.01) |

(52) U.S. Cl.
CPC ............ *C08K 5/1565* (2013.01); *C09D 163/00* (2013.01); *C09J 163/00* (2013.01)

(58) Field of Classification Search
CPC .................................................. C08K 5/1565
USPC ........................................................ 523/455
See application file for complete search history.

(56) References Cited

U.S. PATENT DOCUMENTS

| | | | | |
|---|---|---|---|---|
| 4,432,976 A | * | 2/1984 | Annen et al. | 514/174 |
| 5,869,697 A | * | 2/1999 | Bhushan et al. | 549/34 |
| 6,100,349 A | * | 8/2000 | Koenraadt et al. | 525/528 |

FOREIGN PATENT DOCUMENTS

| | | | |
|---|---|---|---|
| WO | WO 2011/157551 A1 | 12/2011 | |
| WO | WO 2011/157671 A1 | 12/2011 | |
| WO | WO 2012/065879 A1 | 5/2012 | |

OTHER PUBLICATIONS

U.S. Appl. No. 13/853,552, filed Mar. 29, 2013, Porta Garcia, et al.
U.S. Appl. No. 13/733,028, filed Feb. 21, 2013, Gehringer, et al.

\* cited by examiner

*Primary Examiner* — Megan McCulley
(74) *Attorney, Agent, or Firm* — Oblon, McClelland, Maier & Neustadt, L.L.P.

(57) ABSTRACT

Epoxy resin compositions comprising
a) epoxy resins and
b) at least one 2-oxo-[1,3]dioxolane derivative of the formula I

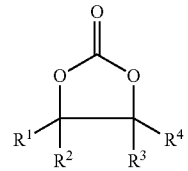

in which one or two of the radicals R1 to R4 are an electron-withdrawing organic group having 1 to 20 C atoms or an electron-withdrawing heteroatom, and the remaining radicals R1 to R4 are independently of one another an H atom or a hydrocarbon group having 1 to 20 C atoms.

16 Claims, No Drawings

EPOXY RESIN COMPOSITIONS COMPRISING A 2-OXO-[1,3] DIOXOLANE DERIVATIVE

The present application incorporates by reference the provisional U.S. application 61/542,828 filed on Oct. 4, 2011.

The invention relates to epoxy resin compositions comprising
a) epoxy resins and
b) at least one 2-oxo-[1,3]dioxolane derivative of the formula I

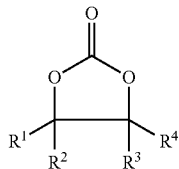

in which one or two of the radicals R1 to R4 are an electron-withdrawing organic group having 1 to 20 C atoms or an electron-withdrawing heteroatom, and the remaining radicals R1 to R4 are independently of one another an H atom or a hydrocarbon group having 1 to 20 C atoms.

Epoxy resins (also called epoxide resins) is a customary term for oligomeric compounds having on average more than one epoxide group per molecule. These resins, by reaction with suitable hardeners or by polymerization of the epoxide groups, can be converted into thermosets. Cured epoxy resins are widespread on account of their outstanding mechanical and chemical properties, such as high impact strength, high abrasion resistance, good chemical resistance, more particularly a high level of resistance toward alkalis, acids, oils, and organic solvents, high weathering stability, excellent adhesiveness to numerous materials, and high electrical insulation capacity.

Reaction with hardeners converts the epoxy resin prepolymers into infusible thermoset materials which are three-dimensionally "crosslinked". Suitable hardeners are compounds having at least two functional groups which are able to react with the epoxide groups (also called oxirane groups) and/or hydroxyl groups of the epoxy resin prepolymers to form covalent bonds; examples are compounds having amino groups, hydroxyl groups, and carboxyl groups, and/or derivatives thereof, such as anhydrides. Accordingly, compounds customarily used as hardeners for epoxy resins include aliphatic and aromatic polyamines, carboxylic anhydrides, polyamidoamines, amino resins or phenolic resins.

The prepolymers used for preparing cured epoxy resins customarily have a high viscosity, which makes application more difficult. Moreover, the high viscosity of the resins frequently restricts the use of fillers, which are desirable for modifying the mechanical properties of the cured resin material. In many cases, moreover, the use of fillers makes it possible to lower the costs of the products manufactured from the resins, such as shaped parts or coatings, for example. As a result of this, it is common to add diluents to the uncured epoxy resin, these diluents lowering the viscosity of the resin to the level desired for application. Suitable diluents are more particularly reactive diluents. Reactive diluents are solvents which have functional groups that react with the epoxide groups of the resin and/or with the functional groups of the hardener to form covalent bonds; these may be compounds, for example, which in turn contain oxirane groups. Reactive diluents are, in particular, glycidyl ethers of polyfunctional aliphatic alcohols such as 1,4-butanediol diglycidyl ether, 1,6-hexanediol diglycidyl ether, diethylene glycol diglycidyl ether or glycidyl ethers of trimethylolpropane. Also suitable in particular are monofunctional reactive diluents; as examples, mention may be made of C12 to C14 fatty alcohol glycidyl ethers.

The hitherto unpublished WO application PCT/EP2011/059767 (PF 70167) discloses epoxy resin compositions which as diluents comprise a 2-oxo-(1,3) dioxolane derivative in which one C atom of the ring system is substituted by an alkylene group, e.g., methylene ($=CH_2$).

2-Oxo-[1,3]dioxolane derivates of the above formula I, and also their preparation and use for preparing polyols or hydroxyurethanes, are described in the hitherto unpublished patent applications PCT/EP2011/058945 (PF 70965) and EP 10191334.1 (PF 71469).

Fundamentally, relative to the prior art, the object is to find alternative diluents for epoxy resin compositions that lower the viscosity and do not adversely affect, or even further improve, the performance properties, more particularly the reactivity.

Object of the present invention, therefore, were epoxy resin compositions with new diluents which meet the above properties.

The Epoxy Resins

Epoxy resins contemplated are more particularly those customarily used in curable epoxy resin compositions. They include more particularly compounds having 1 to 10 epoxide groups, preferably having at least two epoxide groups in the molecule. The amount of epoxide groups in typical epoxy resins is in the range from 120 to 3000 g/equivalent, calculated as so-called epoxide equivalent in accordance with DIN 16945.

Preferred among these are what are called glycidyl-based epoxy resins, more particularly those prepared by etherifying aromatic, aliphatic or cycloaliphatic polyols with epichlorohydrin. Glycidyl-based epoxy resins of this kind are also referred to as polyglycidyl ethers of aromatic, aliphatic or of cycloaliphatic polyols.

The epoxy resins may be liquid resins, solid resins or mixtures thereof. Liquid resins differ from solid resins in lower viscosity. Moreover, liquid resins generally have a higher fraction of epoxide groups and, correspondingly, a lower epoxide equivalent.

The amount of epoxide groups in typical liquid resins is customarily in the range from 120 to 200 g/equivalent, and that of the solid resins in the range of 450-3000 g/equivalent, calculated as so-called epoxide equivalent in accordance with DIN 16945.

The viscosity of the liquid resins at 25° C. is customarily in the range from 1 to 20 Pas, preferably in the range from 5 to 15 Pas. The viscosity of the solid resins at 25° C. is customarily in the 5 to 40 Pas range, preferably in the range from 20 to 40 Pas. The viscosities specified here are the figures determined in accordance with DIN 53015 at 25° C. for 40% strength solutions of the resins in methyl ethyl ketone.

Examples of suitable epoxy resins are those available commercially under the brand names EPILOX®, EPONEX®, EPIKOTE®, EPONOL®, D.E.R, ARALDIT® or ARACAST®.

In one preferred embodiment the epoxy resin is selected from polyglycidyl ethers of aromatic polyols.

Examples of these are the resins derived from the diglycidyl ether of bisphenol A (DGEBA resins, R'=$CH_3$) and the resins derived from bisphenol F (R'=H), which may be described by the following general formula:

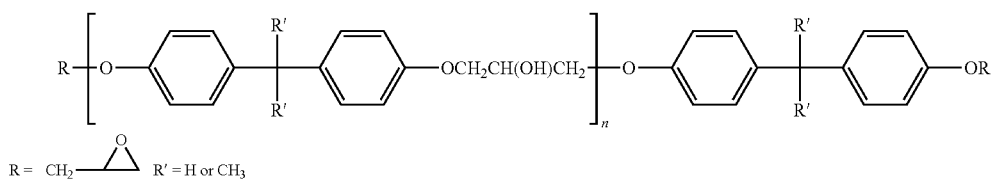

In the formula the parameter n indicates the number of repeating units, with the average value of n corresponding to the respective average molecular weight.

Examples of epoxy resins based on polyglycidyl ethers of aromatic polyols are, in addition, glycidyl ethers of phenol- and cresol-based novolaks. Novolaks are prepared by the acid-catalyzed condensation of formaldehyde and phenol or cresol. Reacting the novolaks with epichlorohydrin gives the glycidyl ethers of the novolaks. Also contemplated more particularly are mixtures of different polyglycidyl ethers or aromatic polyols.

In another preferred embodiment of the invention the epoxy resin is selected from polyglycidyl ethers of cycloaliphatic polyols and from the polyglycidyl esters of cycloaliphatic polycarboxylic acids. Examples of polyglycidyl ethers of cycloaliphatic polyols are the ring-hydrogenation products of polyglycidyl ethers based on bisphenol A, the ring-hydrogenation products of polyglycidyl ethers based on bisphenol F, the ring-hydrogenation products of polyglycidyl ethers based on novolaks, and mixtures thereof. Compounds of these kinds are customarily prepared by selective hydrogenation of the aromatic rings in the aforementioned aromatic polyglycidyl ethers. Examples of such products are P 22-00 from LeunaHarze and Eponex 1510 from Hexion. Exemplary of polglycidyl esters of cycloaliphatic polycarboxylic acids is diglycidyl hexahydrophthalate.

Also suitable as epoxy resins for paint formulations are polyacrylate resins containing epoxide groups. These resins are prepared in general by copolymerization of at least one ethylenically unsaturated monomer which comprises at least one epoxide group, more particularly in the form of a glycidyl ether group, in the molecule, with at least one further ethylenically unsaturated monomer that contains no epoxide group in the molecule, with preferably at least one of the comonomers being an ester of acrylic acid or methacrylic acid. Examples of the ethylenically unsaturated monomers which comprise at least one epoxide group in the molecule are glycidyl acrylate, glycidyl methacrylate, and allyl glycidyl ether. Examples of ethylenically unsaturated monomers which comprise no epoxide group in the molecule are alkyl esters of acrylic and methacrylic acid which comprise 1 to 20 carbon atoms in the alkyl radical, more particularly methyl acrylate, methyl methacrylate, ethyl acrylate, ethyl methacrylate, butyl acrylate, butyl methacrylate, 2-ethylhexyl acrylate and 2-ethylhexyl methacrylate. Other examples of ethylenically unsaturated monomers which comprise no epoxide groups in the molecule are acids, such as acrylic acid and methacrylic acid, for example. Acid amides, such as acrylamide and methacrylamide, for example, vinylaromatic compounds, such as styrene, methylstyrene, and vinyltoluene, nitriles, such as acrylonitrile and methacrylonitrile, vinyl halides and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example. The polyacrylate resin containing epoxide groups customarily has an epoxide equivalent weight of 400 to 2500, preferably 500 to 1500, more preferably 600 to 1200. The number-average molecular weight (determined by gel permeation chromatography using a polystyrene standard) is situated typically in the range from 1000 to 15 000, preferably from 1200 to 7000, more preferably from 1500 to 5000. The glass transition temperature (Tg) is situated typically in the range from 30 to 80° C., preferably from 40 to 70° C., more preferably from 50 to 70° C. (measured by means of differential calorimetry (DSC)). Polyacrylate resins containing epoxide groups are known (cf., e.g., EP-A-299 420, DE-B-22 14 650, DE-B-27 49 576, U.S. Pat. No. 4,091,048 and U.S. Pat. No. 3,781,379). Examples of such resins are Epon 8021, Epon 8111, Epon 8161 from Hexion.

The epoxy resins may also derive from other epoxides (nonglycidyl ether epoxy resins). These include, more particularly, compounds, including oligomers and polymers, which have at least one, more particularly two or more, epoxidized glycolaliphatic groups, more particularly 7-oxabicyclo[4.1.0]heptyl groups, which are obtainable by epoxidizing compounds having cyclohexenyl groups. Examples of the epoxidation products of compounds having at least one cycloolefinic group are 4-epoxyethyl-1,2-epoxycyclohexane and the compound of the following formula:

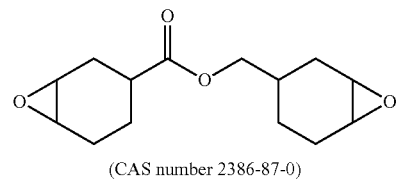 [SMILES: O=C(OCC1CCC2OC2C1)C1CCC2OC2C1]

(CAS number 2386-87-0)

which for example is sold by Cytec under the name Uvacure 1500. It is preferred to use the compounds which have at least one, more particularly two or more, epoxidized cycloaliphatic groups, more particularly 7-oxabicyclo[4.1.0] heptyl groups, which are obtainable by epoxidizing compounds having cycylohexenyl groups, and oligomers thereof, not alone but instead in combination with one or more of the aforementioned substances which have at least two glycidyl ether groups in the molecule.

The above epoxy resins can in each case be used as sole epoxy resins or as a mixture.

Compounds of the Formula I

The epoxy resin compositions comprise a 2-oxo-[1,3]dioxolane derivative of the formula I

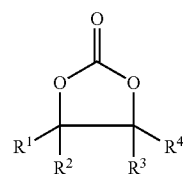

in which one or two of the radicals R1 to R4 are an electron-withdrawing organic group having 1 to 20 C atoms or an electron-withdrawing heteroatom, and the remaining radicals R1 to R4 are independently of one another an H atom or a hydrocarbon group having 1 to 20 C atoms.

Preferably, radicals R1 and R4, or only R1, are an electron-withdrawing organic group having 1 to 20 C atoms, or electron-withdrawing heteroatom.

More preferably, only radical R1 is an electron-withdrawing organic group having 1 to 20 C atoms, or an electron-withdrawing heteroatom.

The remaining radicals R1 to R4 are preferably independently of one another an H atom or a C1 to C10, more particularly a C1 to C4, alkyl group; more preferably the remaining radicals R1 to R4 are an H atom.

Electron-withdrawing heteroatoms include fluorine.

Suitable Electron-Withdrawing Organic Groups are more Particularly
the nitrile group:

a thioester group of the formula

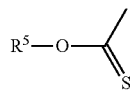

a thioester group of the formula

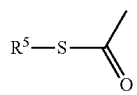

an orthoester group of the formula

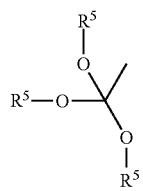

an amide group of the formula

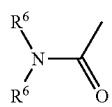

or an ester group of the formula

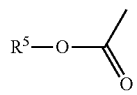

where R5 is a hydrocarbon radical having 1 to 20 C atoms and may optionally be substituted by one or more functional groups selected from carboxylic acid groups, carboxylic ester groups or hydroxyl groups, and the two radicals R6 in the amide group independently of one another are an H atom or a radical R5.

More particularly, R5 in the formulae above may be substituted, for example, by a carboxylic acid group, by one or two hydroxyl groups, or both by a carboxylic acid group and one or two hydroxyl groups. More preferably R5 in each case is an unsubstituted, aliphatic, cycloaliphatic or aromatic hydrocarbon radical having 1 to 10 C atoms. Very preferably R5 is a C1 to C10 alkyl groups, more particularly a C1 to C4 alkyl group, as for example an ethyl group or more particularly a methyl group.

More particularly, the electron-withdrawing organic group or the electron-withdrawing heteroatom is a fluorine atom, a nitrile group, an ester group of the formula

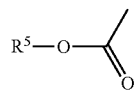

or an amide group of the formula

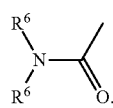

Very preferably, the electron-withdrawing organic group is an ester group of the formula

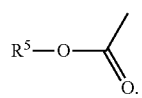

In one particular embodiment the compound of the formula I is a 2-oxo-[1,3]dioxolane-4-carboxylic ester of the formula IIa

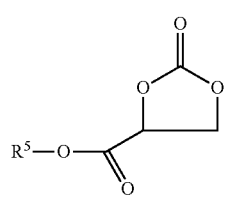

or a 2-oxo-[1,3]dioxolane-4,5-carboxylic diester of the formula IIb

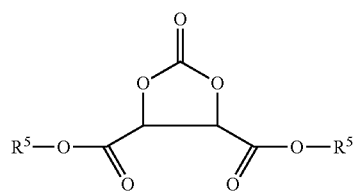

where R5 has the definition above.

Especially preferred are compounds of the formula IIa or IIb in which R5 is a C1 to C4 alkyl radical, more particularly a methyl or ethyl radical, very preferably a methyl radical.

Very particular preference is given to compounds of the formula IIa.

Different 2-oxo-[1,3]dioxolane derivatives of the formula I can be used in a mixture.

2-Oxo-[1,3]dioxolane derivatives can be prepared in a known way from the corresponding epoxides by addition of carbon dioxide ($CO_2$).

One such preparation of 2-oxo-[1,3]dioxolane derivatives of the above formula IIa is described in patent applications PCT/EP2011/058945 (PF 70965) and EP 10191334.1 (PF 71469).

In accordance with EP 10191334.1 (PF 71469) the 2-oxo-[1,3]dioxolane-4-carboxylic esters of the formula IIa are prepared by reaction of the corresponding oxiranes

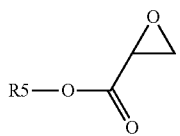

with $CO_2$ at elevated pressure, preferably from 40 to 100 bar, and elevated temperature, preferably 60 to 80° C.

2-Oxo-[1,3]dioxolane derivatives may also be prepared by reaction of diols in which adjacent carbon atoms are substituted by hydroxyl groups with dialkyl carbonates, with elimination of alkanols, preferably with dimethyl carbonate with elimination of methanol or by reaction with phosgene ($COCl_2$) with elimination of HCl.

Accordingly, 2-oxo-[1,3]dioxolane derivatives of the formula IIIb are obtainable by reaction of tartaric diesters, where the two ester groups correspond to the radical R5, with phosgene.

The effect of the compounds of the formula I in the epoxy resin compositions is to lower the viscosity and raise the reactivity, the latter more particularly in the case of aminic curing. In general, the desired dilution effect, and also the increased reactivity, are manifested even with a low level of the compound of the formulae I.

In general, the compound(s) of the formulae I will be used in a total amount of at least 0.1 part by weight, frequently at least 0.5 part by weight, more particularly at least 1 part by weight, more particularly also at least 2 or at least 5 parts by weight, based on 100 parts by weight of the epoxy resins. Frequently the compound(s) of the formulae I will be used in a total amount of not more than 100 parts by weight, preferably not more than 70 parts by weight, more particularly not more than 50 parts by weight, based on 100 parts by weight of the epoxy resins. The epoxy resin compositions therefore comprise compounds of the formula I in amounts of, for example, 0.1 to 100 parts by weight, preferably of 0.1 to 50 parts by weight, more particularly of 0.1 to 30 parts by weight to 100 parts by weight of epoxy resins a), the lower limit of 0.1 part by weight being replaced in preferred embodiments by 0.5 or 1, 2 or 5 parts by weight, as set out above.

Further Constituents of the Epoxy Resin Composition

Besides the epoxy resins and the compounds of the formula I, the epoxy resin compositions may also comprise conventional reactive diluents. By these are meant, in particular, low molecular weight compounds having a molecular weight of preferably not more than 250 daltons, e.g., in the range from 100 to 250 daltons, and containing oxirane groups, preferably glycidyl groups, in the form, for example, of glycidyl ether groups, glycidyl ester groups or glycidyl amide groups. The epoxide functionality, i.e., the number of epoxide groups per molecule, in the case of the reactive diluents is typically in the range from 1 to 3, more particularly in the range from 1.2 to 2.5. Preferred among these are, in particular, glycidyl ethers of aliphatic or cycloaliphatic alcohols which have preferably 1, 2, 3 or 4 OH groups and 2 to 20 or 4 to 20 C atoms, and also glycidyl ethers of aliphatic polyetherols which have 4 to 20 C atoms. Examples of such are as follows:

glycidyl ethers of saturated alkanols having 2 to 20 C atoms, such as $C_2$-$C_{20}$ alkyl glycidyl ethers such as 2-ethylhexyl glycidyl ether, or C12 alkyl to C14 alkyl glycidyl ethers for example;

glycidyl ethers of saturated alkanepolyols having 2 to 20 C atoms, examples being the glycidyl ethers of 1,4-butanediol, 1,6-hexanediol, trimethylolpropane or of pentaerythritol, the aforementioned glycidyl ether compounds generally having an epoxide functionality in the range from 1 to 3.0 and preferably in the range from 1.2 to 2.5;

glycidyl ethers of polyetherols having 4 to 20 C atoms, examples being glycidyl ethers of diethylene glycol, triethylene glycol, tetraethylene glycol, dipropylene glycol or tripropylene glycol;

glycidyl ethers of cycloaliphatic alcohols having 5 to 20 C atoms, such as, for example, bisglycidyl ethers of cyclohexane-1,4-diyl, the bisglycidyl ether of ring-hydrogenated bisphenol A or of ring-hydrogenated bisphenol F;

glycidyl ethers of polyalkylene oxides having 2 to 4 C atoms such as polyethylene oxide or polypropylene oxide;

and mixtures of the above substances.

Where desired, the conventional reactive diluents are used in the epoxy resin compositions in a total amount of at least 1 part by weight, frequently at least 2 parts by weight, more particularly at least 5 parts by weight, per 100 parts by weight of the epoxy resins. Since the compounds of the formula I compensate or even overcompensate the reduction in reactivity that is frequently brought about by conventional reactive diluents, the conventional reactive diluents can be used in a larger amount than in the prior art. In general, however, the conventional reactive diluents will be used in a total amount of not more than 100 parts by weight, preferably not more than 80 parts by weight, more particularly not more than 70 parts by weight, per 10 parts by weight of the epoxy resin component. The total amount of conventional reactive diluent plus compound of the formula I will preferably be not more than 110 parts by weight, in particular not more than 100 parts by weight, and especially not more than 90 parts by weight, per 100 parts by weight of the epoxy resins. Where the epoxy resin compositions of the invention comprise one or more conventional reactive diluents, the weight ratio of compound of the formula I to conventional reactive diluent is typically in a range from 1:100 to 100:1, more particularly in the range from 1:50 to 50:1.

In another particular embodiment of the invention, the weight ratio of compound of the formula I to conventional reactive diluents is in the range from 1:10 to 10:1, more particularly in the range from 1:5 to 5:1.

Furthermore, the epoxy resin compositions may also comprise nonreactive organic diluents. By these are meant organic solvents which at atmospheric pressure have a boiling point of below 200° C. and which do not enter into any bond-forming reaction with the epoxide groups and with the groups of any reactive diluent optionally present. Such diluents are typically organic solvents, examples being ketones having preferably 3 to 8 C atoms such as acetone, methyl ethyl ketone, cyclohexanone, and the like, esters of aliphatic carboxylic acids, preferably of acetic acid, of propionic acid or of butanoic acid, more particularly the $C_1$-$C_6$ alkyl esters of these acids such as ethyl acetate, propyl acetate, and butyl acetate, aromatic hydrocarbon, especially alkylaromatics such as, for example, toluene, mesitylene, 1,2,4-trimethylbenzene, n-propylbenzene, isopropylbenzene, cumene, or xylenes, and mixtures of alkylaromatics, more particularly technical mixtures of the kind available commercially, for example, as Solvesso grades, and aliphatic and cycloaliphatic hydrocarbons, and also alkanols having preferably 1 to 8 C atoms and cycloalkanols having preferably 5 to 8 C atoms, such as methanol, ethanol, n- and isopropanol, butanols, hexanols, cyclopentanol and cyclohexanol, and the like.

In one preferred embodiment the epoxy resin composition comprises nonreactive organic solvents at most in minor amounts (less than 20% by weight, in particular less than 10% by weight or less than 5% by weight, based on the total amount of epoxy resin and compound of the formula I) and with particular preference no such solvent (100% system).

Besides the aforementioned constituents, the epoxy resin composition may comprise the additives and/or fillers that are customary for such compositions.

Examples of suitable fillers include inorganic or organic particulate materials such as, for example, calcium carbonates and silicates and also inorganic fiber materials such as glass fibers, for example. Organic fillers such as carbon fibers and mixtures of organic and inorganic fillers, such as mixtures of glass fibers and carbon fibers or mixtures of carbon fibers and inorganic fillers, for example, may also find application. The fillers can be added in an amount of 1% to 70% by weight, based on the total weight of the epoxy composition.

Suitable conventional additives include, for example, antioxidants, UV absorbers/light stabilizers, metal deactivators, antistats, reinforcers, fillers, antifogging agents, blowing/propelling agents, biocides, plasticizers, lubricants, emulsifiers, colorants, pigments, rheological agents, impact tougheners, catalysts, adhesion regulators, optical brighteners, flame retardants, antidripping agents, nucleating agents, flow control agents, antifoams, solvents, and reactive diluents, and also mixtures of these.

The optionally used light stabilizers/UV absorbers, antioxidants, and metal deactivators preferably have a high migration stability and temperature stability. They are selected, for example, from groups a) to t). The compounds of groups a) to g) and i) constitute light stabilizers/UV absorbers, while compounds j) to t) act as stabilizers.
a) 4,4-diarylbutadienes,
b) cinnamic esters,
c) benzotriazoles,
d) hydroxybenzophenones,
e) diphenylcyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds,
s) polyamide stabilizers, and
t) basic costabilizers.

The Amino Hardeners

The epoxy resin composition, comprising epoxy resins, one or more compounds of the formula I, and optionally other constituents, is cured by addition of hardeners which react with the epoxide groups. Preferably these are amino hardeners.

Amine hardeners crosslink epoxy resins by reaction of the primary or secondary amino functions of the polyamines with terminal epoxide groups of the epoxy resins. Amino hardeners of this kind have at least two amino groups; generally they have 2 to 6, more particularly 2 to 4, amino groups. The amino groups may be primary or secondary amino groups.

Customary amino hardeners are, for example,
aliphatic polyamines such as ethylenediamine, 1,2- and 1,3-propanediamine, neopentanediamine, hexamethylenediamine, octamethylenediamine, 1,10-diamino-decane, 1,12-diaminododecane, diethylenetriamine, triethylenetetramine, tetraethylene-pentamine, trimethyihexamethylenediamine, 1-(3-aminopropyl)-3-aminopropane, 1,3-bis(3-aminopropyl)propane, 4-ethyl-4-methylamino-1-octylamine, and the like;
cycloaliphatic diamines, such as 1,2-diaminocyclohexane, 1,3-bis(aminomethyl)-cyclohexane, 1-methyl-2,4-diaminocyclohexane, 4-(2-aminopropan-2-yl)-1-methylcyclohexane-1-amine, isophoronediamine, 4,4'-diaminodicyclohexylmethane, 3,3'-dimethyl-4,4'-diaminodicyclohexylmethane, 4,8-diaminotricyclo[5.2.1.0]decane, norbornanediamine, menthanediamine, menthenediamine, and the like;
aromatic diamines, such as tolylenediamine, xylylenediamine, especially meta-xylylenediamine, bis(4-aminophenyl)methane (MDA or methylenedianiline), bis(4-aminophenyl) sulfone (also known as DADS, DDS or dapsone), and the like;
cyclic polyamines, such as piperazine, N-aminoethylpiperazine, and the like;
polyetheramines, especially difunctional and trifunctional primary polyetheramine based on polypropylene glycol, polyethylene glycol, polybutylene oxide, poly(1,4-butanediol), poly-THF or polypentylene oxide, e.g., 4,7,10-trioxatridecane-1,3-diamine, 4,7,10-trioxatridecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (BASF SE), 1,3-diamino-4,7,10-trioxatridecane (BASF), primary polyetheramines based on polypropylene glycol having an average molar mass of 230 such as, for example, polyetheramine D 230 (BASF SE) or Jeffamine® D 230 (Huntsman), difunctional, primary polyetheramines based on polypropylene glycol having an average molar mass of 400, e.g. polyetheramine D 400 (BASF SE) or Jeffamine® XTJ 582 (Huntsman), difunctional, primary polyetheramines based on polypropylene glycol having an average molar mass of 2000 such as, for example, polyetheramine D 2000 (BASF SE), Jeffamine® D2000 or Jeffamine® XTJ 578 (Huntsman), difunctional, primary polyetheramines based on propylene oxide having an average molar mass of 4000 such as, for example, polyetheramine D 4000 (BASF SE), trifunctional, primary polyetheramines prepared by reacting propylene oxide with trimethylolpropane followed by an amination of the terminal OH groups, having an average molar mass of 403, such as, for example, polyetheramine T 403 (BASF SE) or Jeffamine® T 403 (Huntsman), trifunctional, primary polyetheramine prepared by reacting propylene oxide with glycerol, followed by an amination of the terminal OH groups, having an average molar mass of 5000, such as, for example, polyetheramine T 5000 (BASF SE) or Jeffamine® T 5000 (Huntsman), aliphatic polyetheramines constructed from a propylene oxide-grafted polyethylene glycol and having an average molar mass of 600, such as, for example, Jeffamine® ED-600 or Jeffamine® XTJ 501 (each Huntsman), aliphatic polyetheramines constructed from a propylene oxide-grafted polyethylene glycol and having an average molar mass of 900, such as, for example, Jeffamine® ED-900 (Huntsman), aliphatic polyetheramines constructed from a propylene oxide-grafted polyethylene glycol and having an average molar mass of 2000, such as, for example, Jeffamine® ED-2003 (Huntsman), difunctional, primary polyetheramine prepared by amination of a propylene oxide-grafted diethylene glycol, having an average molar mass of 220, such as, for example, Jeffamine® HK-511 (Huntsman), aliphatic polyetheramines based on a copolymer of poly(tetramethylene ether glycol) and polypropylene glycol having an average molar mass of 1000 such as, for example, Jeffamine® XTJ-542 (Huntsman), aliphatic polyetheramines based on a copolymer of poly(tetramethylene ether glycol) and polypropylene glycol having an average molar mass of 1900, such as, for example Jeffamine® XTJ-548 (Huntsman), aliphatic polyetheramines based on a copolymer of poly(tetramethylene ether glycol) and polypropylene glycol having an average molar mass of 1400 such as, for example, Jeffamine® XTJ-559 (Huntsman), polyethertriamines based on a butylene oxide-grafted alcohol having a functionality of at least three, having an average molar mass of 400, such as, for example, Jeffamine® XTJ-566 (Huntsman), aliphatic polyetheramines prepared by amination of butylene oxide-grafted alcohols having an average molar mass of 219, such as, for example, Jeffamine® XTJ-568 (Huntsman), polyetheramines based on pentaerythritol and propylene oxide having an average molar mass of 600 such as, for example, Jeffamine® XTJ-616 (Huntsman), polyetheramines based on triethylene glycol having an average molar mass of 148, e.g., Jeffamine® EDR-148 (Huntsman), difunctional, primary polyetheramines prepared by amination of a propylene oxide-grafted ethylene glycol, having an average molar mass of 176, such as, for example, Jeffamine® EDR-176 (Huntsman), and also polyetheramines prepared by amination of PolyTHF having an average molar mass of 250, e.g., PolyTHF-Amine 350 (BASF SE), and mixtures of these amines;

polyamidoamines (amidopolyamines) which are obtainable by reaction of polycarboxylic acids, more particularly dicarboxylic acids such as adipic acid or dimeric fatty acids (e.g., dimeric linoleic acid) with low molecular mass polyamines, such as diethylenetriamine, 1-(3-aminopropyl)-3-aminopropane or triethylenetetramine, or other diamines such as the aforementioned aliphatic or cycloaliphatic diamines, or alternatively are obtainable by Michael addition of diamines with acrylic esters, and subsequent polycondensation of the resulting amino acid esters;

phenalkamines (also phenolalkanamines), meaning phenol or phenol derivatives which are substituted on at least one C atom of the ring system by hydrocarbon groups which contain primary or secondary amino groups; apart from the hydroxyl group of the phenol or phenol derivative and the primary or secondary amino groups, the phenalkamines contain no other functional groups. More particularly the phenalkamines contain both primary and secondary amino groups. Highly suitable phenalkamines contain preferably a total of 2 to 10, more particularly 2 to 8, and, in one particular embodiment, 4 to 6 such amino groups; phenalkamines in question are preferably those based on cardanol, which is present in cashew nut oil; cardanol-based phenalkamines are substituted on at least one, preferably on one to three C atoms of the ring system, by above-described primary or secondary amino groups, preferably aliphatic hydrocarbon groups. These substituents are located more particularly in ortho- or para-position to the hydroxyl group; phenalkamines can be prepared by Mannich reaction from the phenol or phenol derivative, an aldehyde, and a compound having at least one primary or secondary amino group. The phenalkamines are therefore Mannich bases or adducts of amino compounds, more particularly one of the above amino compounds, with epoxide compounds; and adducts of amino compounds with epoxide compounds; such adducts are reaction products of epoxide compounds with an excess of amino compounds, such that all of the epoxide groups have undergone reaction and the compounds obtained still have primary or secondary amino groups, and these adducts, therefore, can be used accordingly as amino hardeners. Preferred epoxide compounds here are those having one or two epoxide groups. Amino compounds used for preparing adducts are preferably low molecular weight amino compounds having primary amino groups, more particularly those as described later on below as well as amino compounds H1 (cohardeners). Examples of adducts include the adducts of xylenediamine (MXDA), isophoronediamine (IPDA) or diethylenetriamine with bisphenol A or bisphenol F;

and also mixtures of the abovementioned amine hardeners.

One preferred embodiment uses mixtures of different amino hardeners, called amino hardeners H1 and amino hardeners H2 below.

Amino hardeners H1 are aliphatic, cycloaliphatic or aromatic amine compounds having 1 to 4 primary amino groups and optionally further functional groups, selected from secondary amino groups, tertiary amino groups, and hydroxyl groups, the primary amino groups, in the case of the cycloaliphatic and aromatic amine compounds, being attached as aminomethylene groups ($H_2N—CH_2—$) to the cycloaliphatic or aromatic ring system.

These amino hardeners H1 are also referred to below as cohardeners, while other amino hardeners, not falling within the above definition of the amine hardeners H1, are referred to below as amino hardeners H2.

The amino hardeners H1 (cohardeners)

Cohardeners may be aliphatic, cycloaliphatic or aromatic amine compounds.

Apart from secondary or tertiary amino groups or hydroxyl groups, the cohardeners having 1 to 4 amino groups contain no other functional groups.

Examples of preferred cohardeners include aliphatic amine compounds which apart from a primary amino group contain no other functional groups, examples being C2 to C8 alkyleneamines, such as ethylamine, propylamine or butylamine.

Examples of preferred cohardeners also include linear or branched aliphatic amine compounds which contain two primary amino groups and otherwise no other functional groups, examples being C2 to C8 alkylenediamines, such as ethylenediamine, propylenediamine or butylenediamine.

Examples of preferred cohardeners also include aliphatic amine compounds which contain one or two primary amino groups and one or two hydroxyl groups and otherwise no other functional groups, examples being monoamines, such as C2 to C8 alkanolamines, such as ethanolamine and isopropanolamine.

Examples of preferred cohardeners also include aliphatic amine compounds which contain a primary amino group and a tertiary amino group and otherwise no other functional groups. Examples include compounds of the formula III

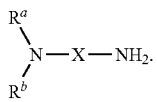

In formula III, $R^a$ and $R^b$ independently of one another are a C1 to C10, preferably a C1 to C4, alkyl group. X is a C2 to C10, preferably a C2 to C4, alkylene group. The alkylene group may be branched or linear; it is substituted at any desired location by the tertiary and the primary amino group. In one preferred embodiment the alkylene group is linear and substituted terminally by the tertiary and primary amino group. An example of one of the particularly preferred cohardeners here is 3-dimethylaminopropylamine (DMAPA).

Preferred cohardeners are also aliphatic amine compounds which contain one or two primary amino groups, preferably one primary amino group, and one secondary amino groups and one hydroxyl group, and otherwise no other functional groups. These are more particularly N-(2-aminoalkyl)alkanolamines, e.g., N-(2-aminoethyl)ethanolamine ($H_2N$—$CH_2$—$CH_2$—NH—$CH_2$—$CH_2$—OH). The two alkylene groups in these compounds preferably consist of 2 to 8 C atoms.

Examples of preferred aromatic cohardeners also include benzene substituted by one to three aminomethylene groups ($H_2N$—$CH_2$—). This more particularly is benzene substituted by two $H_2N$—$CH_2$— groups at any desired position of the benzene ring, e.g., xylenediamine with the formula

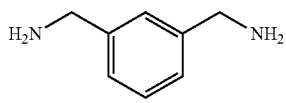

Examples of preferred cycloaliphatic cohardeners also include cyclohexane substituted by one to three aminomethylene groups ($H_2N$—$CH_2$—). More particularly this is cyclohexane which is substituted by two $H_2N$—$CH_2$— groups at any desired position of the benzene ring.

Also contemplated, of course, are any desired mixtures of the above cohardeners.

The cohardeners preferably have a molecular weight of less than 500 g/mol, more particularly less than 300 g/mol.

Preferred cohardeners are composed in total of a maximum of 10 C atoms; particularly preferred cohardeners are composed in total of a maximum of 8 C atoms.

Of the cohardeners identified above, the aliphatic compounds are preferred; particularly preferred aliphatic compounds are those having only one primary amino group and optionally one tertiary amino group or optionally one hydroxyl group and otherwise no other functional group.

The weight fraction of the cohardeners is preferably from 2% to 40% by weight, more preferably from 5% to 35% by weight, based on the weight total of all amino hardeners.

The cohardeners are used preferably in amounts of 0.1 to 30 parts by weight, more preferably in amounts of 0.5 to 20 parts by weight, based on epoxy resins a).

The amino hardeners used in addition to the cohardeners are amino hardeners H1 which do not fall within the above definition of the cohardeners, as set out above. The fraction of these amino hardeners H2 is then, correspondingly, preferably 60% to 98% by weight, more preferably 65% to 95% by weight, based on the weight total of all amine hardeners.

Examples of amino hardeners H2 of these kinds include polyamidoamines, phenalkamines, epoxy-amine adducts, polyetheramines or other amino compounds different from the amino hardeners H1 (cohardeners), or mixtures thereof.

The amino hardeners H2 are preferably polyamidoamines, phenalkamines, epoxy-amine adducts, polyetheramines or mixtures thereof.

If mixtures of different amino hardeners are used, they may be mixed beforehand and then added as a mixture to the epoxy resin composition, or else they may also be added separately. They can also be added simultaneously or in conjunction with other constituents of the epoxy resin composition. Examples of such constituents contemplated include the additives identified above.

The total amount of amino hardener required for curing, or weight total of all amino hardeners H1 and H2, is determined in a manner known per se via the number of epoxide groups in the formulation and the number of functional groups in the hardener. The number of epoxide groups in the epoxy resin is specified as the so-called epoxide equivalent. The epoxide equivalent is determined in accordance with DIN 16945.

The number of primary and secondary amino groups can be calculated via the amine number in accordance with DIN 16945.

The amino hardeners are preferably used in total in amounts such that the ratio of the number of all primary and secondary amino groups to the number of all epoxide groups in the epoxy resin is 2:1 to 1:2, preferably 1.5:1 to 1:1.5, and more particularly about 1:1. At a stoichiometric ratio of about 1:1, a cured resin with optimum thermoset properties is obtained. Depending on the desired properties of the resin after crosslinking, however, it may also be useful to use hardener and epoxy resin in other ratios of the reactive groups.

In the epoxy resin compositions, accordingly, the total amount of amino hardeners (weight total of H1 and H2) is generally 0.1% by weight to 50% by weight, frequently 0.5% to 40% by weight, and more particularly 1% to 30% by weight, based on the weight total of epoxy resin a), compounds of the formulae I, and amino hardeners H1 and H2.

Besides amino hardeners there may also be other hardeners used as well, e.g., anhydride hardeners. In one preferred embodiment, however, amine compounds exclusively are used.

Contemplated additionally as further constituents of the epoxy resin compositions, or of a separate hardener mixture, are catalysts which accelerate the curing reaction, examples being phosphonium salts of organic or inorganic acids, imidazole and imidazole derivatives, or quaternary ammonium compounds. Such other catalysts are, where desired, used in fractions of 0.01% by weight to about 10% by weight, based on the total weight of the epoxy resin, the compound I, and total amount of the amino hardeners. In one preferred embodiment, no such catalysts are required, i.e., the amount of such catalysts in the composition is less than 0.5%, more particularly less than 0.1% by weight, or less than 0.01% by weight.

In another preferred embodiment, catalysts used may comprise compounds of the formula IV below

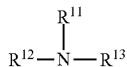

(IV)

where at least one of the radicals R11, R12, and R13 is a hydrocarbon group having 1 to 10 C atoms which is substituted by a hydroxyl group, and any remaining radicals R11 to R13 are an unsubstituted hydrocarbon group having 1 to 10 C atoms.

Preferably in formula IV all three radicals R11, R12, and R13 are a hydrocarbon group having 1 to 10 C atoms which is substituted by a hydroxyl group.

More preferably the radicals R11, R12, and R13 independently of one another are a C2 to C10 hydroxyalkyl group.

Very preferably the compound of the formula IV is triethanolamine or triisopropanolamine.

The compound of the formula IV acts as catalyst (accelerant). It may be added separately or together with the amino hardeners to the epoxy resin composition.

The compound of the formula IV can be used, if desired, preferably in amounts of 0.1 to 30 parts by weight, more preferably in amounts of 0.5 to 20 parts by weight, based on epoxy resins a).

In epoxy resin compositions, a fundamental distinction is made between one-component (1-pack) and two-component (2-pack) systems. With two-pack systems, epoxy resin and hardener remain separate until shortly before curing (hence 2-pack), since the epoxy resin and the hardener are highly reactive. With 2-pack systems, the hardener is not added until shortly before curing to the epoxy resin composition.

The epoxy resin compositions of the invention are more particularly 2-pack systems.

The addition of the hardeners, preferably of a hardener mixture comprising at least one amino hardener, takes place, accordingly, not until shortly before use.

The two-component epoxy resin composition therefore comprises a separate epoxy resin composition, which comprises epoxy resins, compounds of the formula I, and optionally other constituents, but no hardeners, more particularly no amino hardener, and a separate hardener mixture, which comprises hardeners, preferably amino hardeners, but no epoxy resins.

The hardener mixture more preferably comprises a mixture of amino hardeners H1 and H2 and optionally other constituents, including, for example, an accelerant of the formula IV, as set out above.

After the hardeners have been added to the epoxy resin composition, curing takes place.

Curing may then take place thermally by heating of the composition. The curing of the epoxy resin compositions takes place customarily at temperatures in the range from −10 to 200° C., preferably in the range from −10 to 180° C., and more particularly in the range from −10 to 150° C.

Alternatively, curing may also take place, for example, with microwave induction. Curing takes place more particularly at −10 to 80° C., and in one particularly preferred embodiment at −10 to 40° C. or at −10 to 20° C. An advantageous feature is that the curing can take place under standard ambient conditions such as room temperature and/or sunlight exposure.

The epoxy resin compositions can be used in a diversity of ways. They are suitable, for example, as a binder constituent in coating or impregnating materials, as adhesives, for producing composite materials, especially those based on carbon fiber materials or glass fiber materials, for producing moldings, or as casting compositions, especially as casting compositions for embedding, attaching or consolidating moldings. These and the observations below apply both to the 1-pack and to 2-pack systems; preferred systems, for all of the stated utilities, are the 2-pack systems.

Coating compositions include, for example, paints. With the epoxy resin compositions of the invention (1-pack or 2-pack), and with the method of the invention, it is possible in particular to obtain scratch-resistant protective paint coatings on any desired substrates, composed of metal, plastic or woodbase materials, for example.

Since the reactivity of the epoxy resin compositions is comparatively high, curing can be effected at low temperatures, as for example in the range from 0 to 50° C. and more particularly in the range from 5 to 35° C. This makes the epoxy resin compositions especially suitable for the coating of substrates of very large surface area, which cannot be heated, or can be heated only with difficulty, to temperatures above the ambient temperature. This includes in particular the coating of floors, particularly in highly trafficked areas, as for example for the coating of traffic areas in public buildings or squares, or for the coating of parking areas and access points of parking areas. Particularly included here as well is the coating of large-surface-area metal components and metal constructions, such as in or on buildings or boats (marine coating), for example.

The epoxy resin compositions are also suitable as insulating coatings in electronic applications, as an insulating coating for wires and cables, for example. Their use for producing photoresists may also be mentioned. They are especially suitable, too, as repair paint material, in connection, for example, with the repair of pipes without pipe disassembly (cure in place pipe (CIPP) rehabilitation). They are suitable as well for the sealing and coating of floors.

The epoxy resin compositions are also suitable as adhesives, e.g., 2-pack structural adhesives. Structural adhesives serve for the permanent joining of shaped parts to one another. The shaped parts may be made of any desired material; materials contemplated include plastic, metal, wood, leather, ceramic, etc. The adhesives may also be hot melt adhesives, which are fluid and processable only at a relatively high temperature. They may also be flooring adhesives. The compositions are also suitable as adhesives for producing printed circuit boards (electronic circuits), not least by the SMT (surface mounted technology) method.

The epoxy resin compositions are especially suitable also for producing composite materials. In composite materials (composites), different materials, examples being plastics and reinforcing materials (fibers, carbon fibers), are joined to one another through the cured epoxy resin.

The epoxy resin compositions are suitable, for example, for producing epoxy resin-impregnated fibers or for producing preimpregnated yarns and fabrics produced from fibers, as for example for producing prepregs which are processed further into composites. Production methods for composites include the curing of preimpregnated fibers or fiber fabrics (e.g., prepregs) after storage, or else the extrusion, pultrusion, winding, and resin transfer molding (RTM) and resin infusion (RI) technologies. In particular, the fibers and/or the yarns and fabrics produced from them may be impregnated with the composition of the invention and thereafter cured at an elevated temperature.

As casting compositions for embedding, attaching or consolidating moldings, the epoxy resin compositions are used, for example, in electronic applications. They are suitable as flip-chip underfill or as electrical casting resins for potting, casting, and (glob-top) encapsulation.

The epoxy resin composition is suitable more particularly for a method for coating surfaces by applying the epoxy resin composition to the surface that is to be coated, and curing it. This coating method is not subject to any restrictions in terms of the surface to be coated. Examples of suitable surfaces are metal surfaces, wood surfaces, glass surfaces, plastics surfaces. A skilled person, however, is also able by means of simple preliminary tests to ascertain whether other surfaces are suitable for coating in line with the method of the invention.

Particular advantages that may be stated for the epoxy resin compositions of the invention include the low viscosity through using compounds of the formula I, and the good performance properties, including more particularly the high cure rate.

EXAMPLES

Epoxy resins of component A used were the following substances:

Epoxy Resin 1:
Aromatic epoxy resin based on bisphenol A, having an epoxide equivalent of 182-192 g/eq and a viscosity at 25° C. in the range of 10-14 Pa·s (Epilox A 19-03).

Epoxy Resin 2:
Aromatic epoxy resin based on bisphenol A, having an epoxide equivalent of 175-185 g/eq and a viscosity at 25° C. of 8-10 PA·s (Epilox A 18-00).

Epoxy Resin 3:
Cycloaliphatic epoxy resin in the form of a hydrogenated glycidyl ether based on bisphenol A, having an epoxide equivalent of 205-235 g/eq and a viscosity at 25° C. in the range of 1.5-3.0 Pa·s (Leuna P 22-00)

As a compound of the formula I (dioxolane derivative) the compound of the formula IIa:

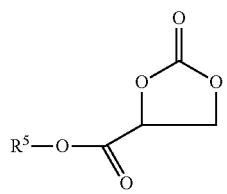

was used, where R5 is a methyl group.

Hardeners used were the following substances:
Isophoronediamine (IPDA)
Xylenenediamine (MXDA)
In the tables pbw denotes parts by weight 2) Performance Testing 2.1) Determination of Gel Time The gel time was determined by conducting rheological investigations on the epoxy resin compositions. The reactivity of the compositions was determined by monitoring the course of reaction using a rheometer (oscillation mode). For evaluation, the measured storage modulus G' was plotted against the loss modulus G". The intersection of the two curves is the gel point. The corresponding time is the gel time. The gel time is a measure of the reactivity of the epoxy composition, the shorter the gel time, the higher the reactivity.

For this purpose, the hardener and the cohardener were added in the quantities indicated in the table to the epoxy resin, and placed immediately into the measuring cell of the rheometer. The temperature was 23° C.

2.2) Determination of Tack-Free Time/Through-Drying

The tack-free time was determined by means of a sand application instrument which has one or more closeable funnels for holding fine sand (grain size up to 600 μm) and has two narrow metal pressure rollers mounted at the outlet of each funnel, the funnel being movable horizontally at constant speed in the running direction of the pressure rollers.

For the determination of the tack-free time/through-drying, each epoxy resin composition is applied using a coating bar to a glass plate (38*7 cm). Immediately thereafter, the sand-filled funnel and the pressure rollers are mounted onto the glass plate surface coated with the epoxy resin composition, in such a way that the pressure rollers are pointing in the lengthwise direction of the coated glass plate. The closure at the outlet of the funnel is opened, and the funnel is moved horizontally at constant speed (1 cm/h or 10 cm/h) in the direction of the pressure rollers. This forms a sand track and two pressure tracks, parallel to the sand track, in the coating material surface. The measurement temperature is around 23+/−2° C. and the atmospheric humidity around 50%. After one complete passage, the excess sand is removed with a brush and the lengths of the pressure tracks and the length of the sand track are ascertained. The tack-free time is obtained by multiplying the length of the sand track by the speed of the funnel, and the through-drying time is obtained by multiplying the length of the pressure track by the speed of the funnel.

2.3) The Following Investigations were also Carried out:

Hardness PH (pendulum hardness on galvanized steel in a method based on DIN EN ISO 1522/KÖNIG method);

Flexibility EC (cupping test as per DIN EN ISO 1520);

(Dry) adhesion (cross-cut testing with adhesive-tape removal, as per DIN EN ISO 2409 GT-TR);

Solvent resistance, method based on DIN 68860/68861 and DIN EN 12720.

TABLE 1

| | Gel time of aromatic epoxy resin 1 | | | | |
|---|---|---|---|---|---|
| # | Epoxy resin 1 [pbw] | Compound of the formula IIa (diluent) [pbw] | Hardener Type | [pbw] | Gel time [min] |
| 1 | 10 | 0 | IPDA | 2.36 | 572 |
| 2 | 9.9 | 0.1 | IPDA | 2.40 | 480 |
| 3 | 9.75 | 0.25 | IPDA | 2.45 | 415 |
| 4 | 9.5 | 0.5 | IPDA | 2.54 | 310 |
| 5 | 9.0 | 1.0 | IPDA | 2.71 | 242 |
| 6 | 10 | 0 | MXDA | 1.86 | 434 |
| 7 | 9.9 | 0.1 | MXDA | 1.90 | 364 |
| 8 | 9.75 | 0.25 | MXDA | 1.94 | 293 |
| 9 | 9.5 | 0.5 | MXDA | 2.01 | 247 |
| 10 | 9.0 | 1.0 | MXDA | 2.15 | 198 |

TABLE 2

Tack-free times and pendulum damping of a cured
epoxy resin composition based on epoxy resin 2

| Constituent | Epoxy resin composition C1 | 1 | 2 | 3 | 4 | 5 |
|---|---|---|---|---|---|---|
| A18-00 [pbw] | 10 | 9.9 | 9.75 | 9.5 | 9 | 8 |
| Compound of formula IIa [pbw] | | 0.1 | 0.25 | 0.5 | 1 | 2 |
| IPDA [pbw] | 2.39 | 2.42 | 2.48 | 2.56 | 2.74 | 3.09 |
| Tack-free time [min] | 60 | 30 | 30 | 30 | <30 | <30 |
| Through-curing [min] | 360 | 300 | 240 | 210 | 180 | 120 |
| Pendulum damping | | | | | | |
| [s] | 212.8 | 231 | 232.4 | 235.2 | 225.4 | 212.8 |
| [Deflections] | 152 | 165 | 166 | 168 | 161 | 152 |

TABLE 3

Tack-free times and pendulum damping of a cured
epoxy resin composition based on epoxy resin 3

| Constituent | Epoxy resin composition C1 | 1 | 2 | 3 | 4 | 5 |
|---|---|---|---|---|---|---|
| P22-00 [pbw] | 10 | 9.9 | 9.75 | 9.5 | 9 | 8 |
| Compound of formula IIa [pbw] | | 0.1 | 0.25 | 0.5 | 1 | 2 |
| IPDA [GT] | 1.95 | 1.99 | 2.05 | 2.15 | 2.35 | 2.74 |
| Tack-free time [min] | 360 | 300 | 240 | 210 | 180 | 120 |
| Through-curing [min] | 720 | 660 | 600 | 570 | 480 | 240 |
| Pendulum damping | | | | | | |
| [s] | 100.8 | 120.4 | 121.8 | 126 | 123.2 | 156.8 |
| [Deflections] | 72 | 86 | 87 | 90 | 88 | 112 |

The invention claimed is:

1. An epoxy resin composition, comprising:
   a) an epoxy resin; and
   b) at least one 2-oxo-[1,3]dioxolane compound selected from the group consisting of a 2-oxo-[1,3]dioxolane-4-carboxylic ester of formula (Ia) and a 2-oxo-[1,3]dioxolane-4,5-carboxylic diester of formula (Ib):

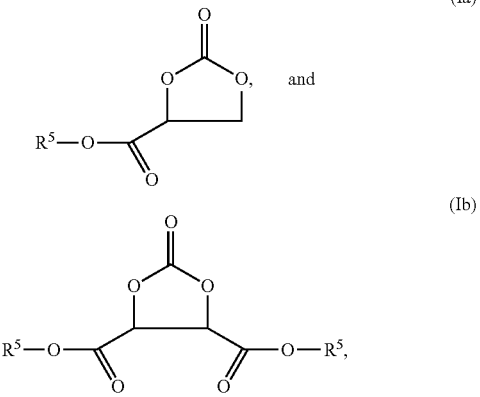

wherein, in formulae (Ia) and (Ib), $R^5$ is a C1 to C10 alkyl group.

2. The epoxy resin composition of claim 1, comprising a 2-oxo-[1,3]dioxolane-4-carboxylic ester of formula (Ia).

3. The epoxy resin composition of claim 2, wherein, in formula (Ia), $R^5$ is a methyl group.

4. The epoxy resin composition claim 1, comprising a 2-oxo-[1,3]dioxolane-4,5-carboxylic diester of formula (Ib).

5. The epoxy resin composition of claim 1, wherein component a) is a polyglycidyl ether of an aromatic, an aliphatic, or a cycloaliphatic polyol.

6. The epoxy resin composition of claim 5, wherein component a) is a polyglycidyl ether of an aromatic polyol.

7. The epoxy resin composition of claim 5, wherein component a) is a polyglycidyl ether of a cycloaliphatic polyol.

8. The epoxy resin composition of claim 1, wherein the epoxy resin composition comprises from 0.1 to 100 parts by weight of the 2-oxo-[1,3]dioxolane compound b) to 100 parts by weight of epoxy resin a).

9. A two-component epoxy resin composition, comprising:
   an epoxy resin composition of claim 1; and
   a separate hardener mixture comprising an amino hardener.

10. The two-component epoxy resin composition of claim 9, wherein the hardener mixture comprises
    at least one amino hardener H1 selected from the group consisting of an aliphatic, a cycloaliphatic or an aromatic amine compound having 1 to 4 primary amino groups and optionally a further functional group selected from a secondary amino group, a tertiary amino group, and a hydroxyl group, the primary amino groups, in the case of the cycloaliphatic and aromatic amine compounds, being attached as aminomethylene groups ($H_2N$—$CH_2$—) to the cycloaliphatic or aromatic ring system; and
    at least one amino hardener H2 selected from the group consisting of a polyamidoamine, a phenalkamine, an epoxy-amine adduct, a polyetheramine, or an amine hardener that is different from the amine hardner H1.

11. A coating material, comprising the epoxy resin composition of claim 1.

12. A casting composition, comprising the epoxy resin composition of claim 1.

13. A composite material, comprising the epoxy resin composition of claim 1.

14. A structural adhesive, comprising the epoxy resin composition of claim 1.

15. Fibers or yarns impregnated with the epoxy resin composition of claim 1.

16. The epoxy resin composition of claim 1, wherein the epoxy resin composition comprises from 5 to 30 parts by weight of the 2-oxo-[1,3]dioxolane compound b) to 100 parts by weight of epoxy resin a).

* * * * *